(12) United States Patent
Watanabe (10) Patent No.: US 8,292,568 B2
(45) Date of Patent: Oct. 23, 2012

(54) WIND TURBINE GENERATOR HAVING A DETECTION UNIT FOR DETECTING FOREIGN OBJECT INSIDE ROTOR AND OPERATING METHOD THEREOF

(75) Inventor: Naota Watanabe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 66 days.

(21) Appl. No.: 12/845,068

(22) Filed: Jul. 28, 2010

(65) Prior Publication Data

US 2011/0293417 A1    Dec. 1, 2011

(30) Foreign Application Priority Data

May 31, 2010   (WO) .................. PCT/JP2010/059205

(51) Int. Cl.
*F03D 7/00*    (2006.01)
*F03D 11/00*   (2006.01)
(52) U.S. Cl. ................. 415/1; 415/118; 416/61
(58) Field of Classification Search .......... 415/118, 415/119, 121.1, 1; 416/61
See application file for complete search history.

(56) References Cited

U.S. PATENT DOCUMENTS

| | | | |
|---|---|---|---|
| 2,640,131 A * | 5/1953 | Cole | 200/543 |
| 6,172,315 B1 * | 1/2001 | Miller et al. | 200/61.73 |
| 6,286,226 B1 * | 9/2001 | Jin | 33/706 |
| 6,785,637 B1 | 8/2004 | Wobben | |
| 6,837,681 B2 | 1/2005 | Wobben | |
| 6,966,754 B2 | 11/2005 | Wobben | |
| 7,072,784 B2 | 7/2006 | Wobben | |
| 2010/0013227 A1 | 1/2010 | Weitkamp | |
| 2011/0062720 A1 * | 3/2011 | Reinhard | 290/55 |

FOREIGN PATENT DOCUMENTS

| | | |
|---|---|---|
| JP | 10219630 A | 8/1998 |
| JP | 2002315395 | 10/2002 |
| JP | 2003511657 | 3/2003 |
| JP | 2004525295 | 8/2004 |
| JP | 2004294386 A | 10/2004 |
| JP | 2009544880 | 12/2009 |

OTHER PUBLICATIONS

Machine Translation of JP2002315395 retrieved from PAJ on Jan. 13, 2012.*
ISR for PCT/JP2010/059205 dated Aug. 10, 2010.

* cited by examiner

*Primary Examiner* — Edward Look
*Assistant Examiner* — Jesse Prager
(74) *Attorney, Agent, or Firm* — Kanesaka Berner & Partners (57) ABSTRACT

In order to provide a wind turbine generator and an operation method of the wind turbine generator which is not subjected to damages caused by foreign objects inside a rotor hub, the wind turbine generator comprises blades, a rotor hub to which the blades are fixed, a rotating shaft such as a main shaft and a coupling being connected to the rotor hub and rotating with the rotor hub, a FO detection sensor arranged inside the rotor hub for detecting a foreign object inside the rotor hub, a brake device such as a pitch control unit and a parking brake for stopping the rotation of the rotating shaft, and a controller for controlling the brake device to stop the rotation of the rotating shaft when the FO detection sensor detects the foreign object.

5 Claims, 7 Drawing Sheets

WIND TURBINE GENERATOR HAVING A DETECTION UNIT FOR DETECTING FOREIGN OBJECT INSIDE ROTOR AND OPERATING METHOD THEREOF

RELATED APPLICATIONS

The present application is based on, and claims priority from, International Application Number PCT/JP2010/059205, filed May 31, 2010, the disclosure of which is hereby incorporated by reference herein in its entirety.

BACKGROUND OF THE INVENTION

1. Field of the Invention

The present invention relates to a wind turbine generator having a detection unit for detecting a foreign object inside a rotor and an operating method of the wind turbine generator.

2. Description of the Related Art

In a wind turbine generator, for example, the wind turbine generator being equipped with blades and a rotor hub is rotated, and the rotation of the rotor is transmitted to a generator via a rotation shaft so as to rotate a shaft of the generator, thereby generating electricity. The rotor hub for example houses a variety of devices such as a pitch control mechanism for adjusting the pitch angle of the blades in accordance with the wind conditions (e.g. wind power and wind direction). These devices are fixed for example directly to an inner wall of the rotor hub or via a mount to be installed in the rotor hub by bolts.

During the operation of the wind turbine generator, the bolts that fix the devices such as the pitch control mechanism inside the rotor hub may become loose by the rotation of the rotor hub, and the bolts and components consisting the devices may fall off. Occasionally, workers conduct inspections inside the rotor hub and may leave tools inside the rotor hub. When foreign objects such as materials that fell off and the tools exist in the rotor hub, the devices inside the rotor hub can be significantly damaged with the rotation during the operation of the wind turbine generator.

Patent Document 1 discloses to use a sound pick-up to detect the abnormality of the blades, the generator and a drive-train by using an acoustic monitoring system, although this does not take measure to detect the foreign objects inside the rotor hub.

RELATED PATENT DOCUMENT

Patent Document

[Patent Document 1] U.S. Pat. No. 7,072,784B2

SUMMARY OF THE INVENTION

Patent Document 1 does not take measures against the damages in the rotor hub caused by the foreign objects. Even if the sound pick-up is used to detect the foreign objects inside the rotor hub, it is possible that the damage has already progressed inside the rotor hub before it make an abnormal noise, and also it is difficult to specify the noise that corresponds to the foreign objects inside the rotor hub as the sound pick-up obtains acoustic data formed with various noise patterns.

In view of the problem above, an object of the present invention is to provide a wind turbine generator and an operation method of the wind turbine generator which is not subjected to damages caused by foreign objects inside a rotor hub.

In order to solve the problem, the present invention provides a wind turbine generator comprising: blades; a rotor hub to which the blades are fixed; a rotating shaft which is connected to the rotor hub and rotates with the rotor hub; a sensor which is arranged inside the rotor hub and detects a foreign object inside the rotor hub; a brake device which stops rotation of the rotating shaft; and a controller which controls the brake device to stop the rotation of the rotating shaft when the sensor detects the foreign object.

This wind turbine generator is equipped with the sensor for detecting a foreign object inside the rotor hub and a controller for controlling the brake device to stop the rotation of the rotating shaft when the sensor detects the foreign object so that the inner structure of the rotor hub is safe from the damages caused by the foreign object in the rotor hub.

In this specification, the rotating shaft of the wind turbine generator refers to any one of shaft members included in the drive train which transmits the rotation from the rotor head to the generator.

The sensor for detecting the foreign object, for example, can be any member that can output the influence of the contact member touched by the foreign object as a change of a physical quantity and may be physical, mechanical or electrical sensor but not limited to this. The physical quantity herein means a physical quantity that reflects the influence caused when the foreign object makes contact with the sensor. The change of the physical quantity is the amount of change in the physical quantity before and after the foreign object touches the sensor, and for example, change of pressure or strain caused the foreign object touches the sensor, or change of tension being generated when the sensor is deformed by the contact of the foreign object, or change of electric resistance caused when the sensor is deformed or disconnected, e.g. change of electric current or pressure being applied to the sensor.

In the wind turbine generator, it is preferable that the sensor comprises: a contact part which is fixed to an inner wall of the rotor hub so as to be in contact with the foreign object; and a limit switch which is connected to the contact part and is turned on or off by tension being generated when the contact part comes in contact with the foreign object.

By using the sensor having the limit switch being connected to the contact part which is fixed to the inner wall of the rotor hub, ON/OFF state of the limit switch is changed by the tension being generated when the contact part comes in contact with the foreign object and thus the present of the foreign object inside the rotor hub can be detected with high precision. Further, the contact part may be a form of a rope arranged with a predetermined height off from the inner wall of the rotor hub or a net set up from the inner wall of the rotor hub.

In the wind turbine generator, it is also preferable that the sensor comprises a contact part which is formed of a conductive wire fixed to an inner wall of the rotor hub so as to be in contact with the foreign object; and a detector which detects conduction state of the contact part.

In this manner, the sensor for detecting the foreign object inside the rotor hub is constructed such that the conduction state of the contact part (conductive wire) being fixed to the inner wall of the rotor hub is detected by the detector so that the foreign object can be detected when the foreign object disconnects the conductive wire of the sensor and thus the presence of the foreign object in the rotor hub can be detected. Furthermore, the contact part (conductive wire) of the sensor may be a form of a rope arranged with a predetermined height off from the inner wall of the rotor hub or a net set up from the inner wall of the rotor hub.

It is also preferable that the contact part is arranged to extend in an axial direction of the rotating shaft along the inner wall of the rotor hub.

The foreign object inside the rotor hub collides against the inner structure of the rotor hub while moving or falling along the inner wall of the rotor hub. Therefore, the contact part is preferably arranged extending in the axial direction of the main shaft along the inner wall of the rotor hub so that the probability that the foreign object makes contact with the contact part increases significantly, and the presence of the foreign object in the rotor hub can be detected at an early stage.

The present invention also proposes an operating method of a wind turbine generator including blades, a rotor hub to which the blades are fixed, a rotating shaft which is connected to the rotor hub and rotates with the rotor hub, a sensor which is arranged in the rotor hub and detects a foreign object inside the rotor hub, and a brake device which stops rotation of the rotating shaft, the operating method comprising the steps of: detecting the foreign objects in the rotor hub by the sensor; and when the foreign object is detected by the sensor, stopping rotation of the rotating shaft by the brake device.

According to the operating method of the wind turbine generator, the foreign object inside the rotor hub can be detected by the sensor and also the rotation of the rotating shaft can be stopped when the foreign object is detected, so that the inner structure of the rotor hub is safe from the damages caused by the foreign object present inside the rotor hub.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
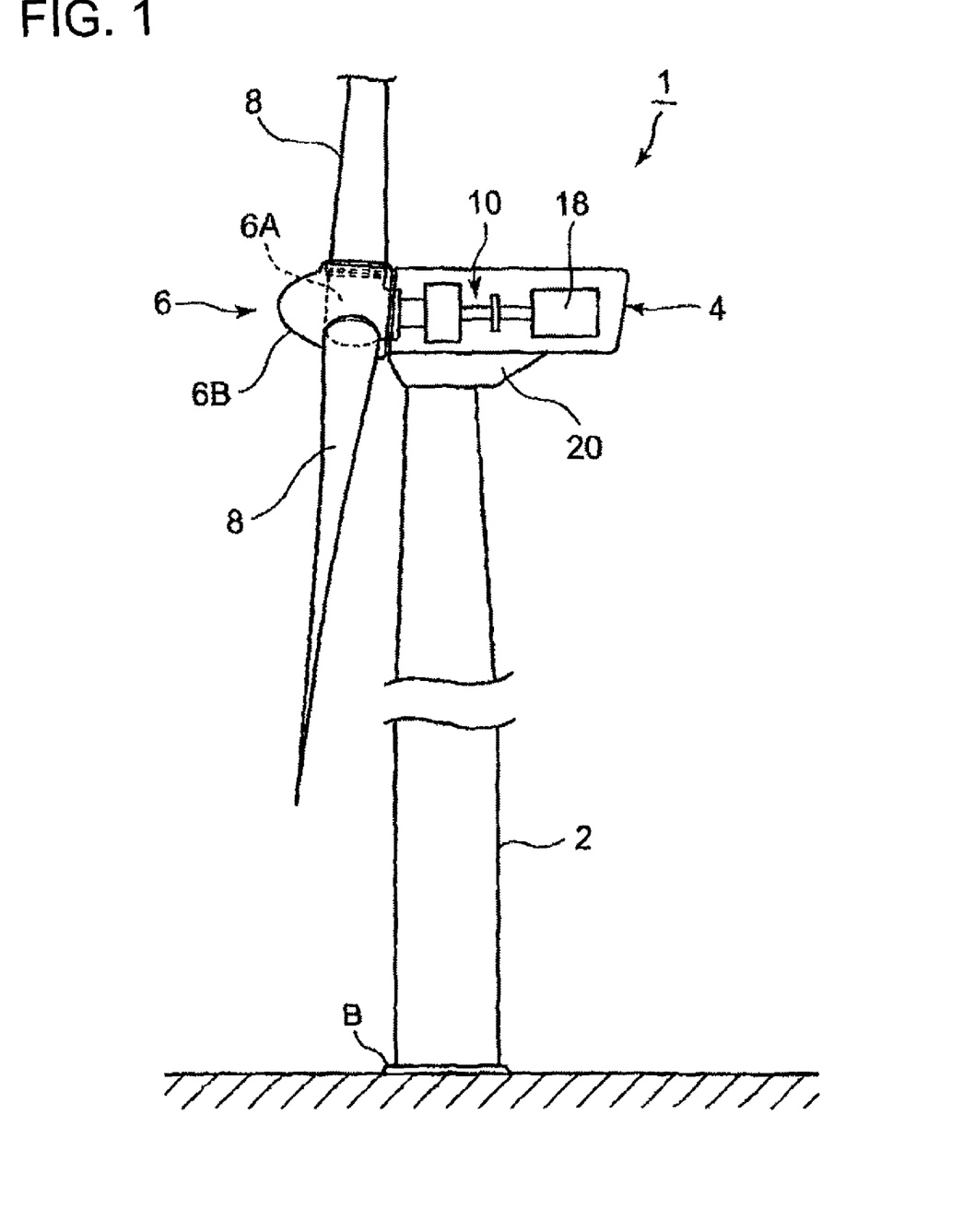
FIG. 1 A general structure of a wind turbine generator.

FIG. 1 is a general structure of a wind turbine generator. A wind turbine generator 1 mainly includes, as shown in FIG. 1, a tower 2 provided to stand on a foundation B, a nacelle 4 provided on the upper end of the tower 2, a rotor head 6 provided on the nacelle 4, and a plurality of blades 8 attached to the rotor head 6.

As shown in FIG. 1, the tower 2 has a column-like shape extending upwardly (to the upper end of FIG. 1) from the foundation B and the nacelle 4 arranged on the uppermost part thereof.

The nacelle 4 supports the rotor head 6 and accommodates a rotation shaft 10 and a generator 18, etc.

Figure 2:
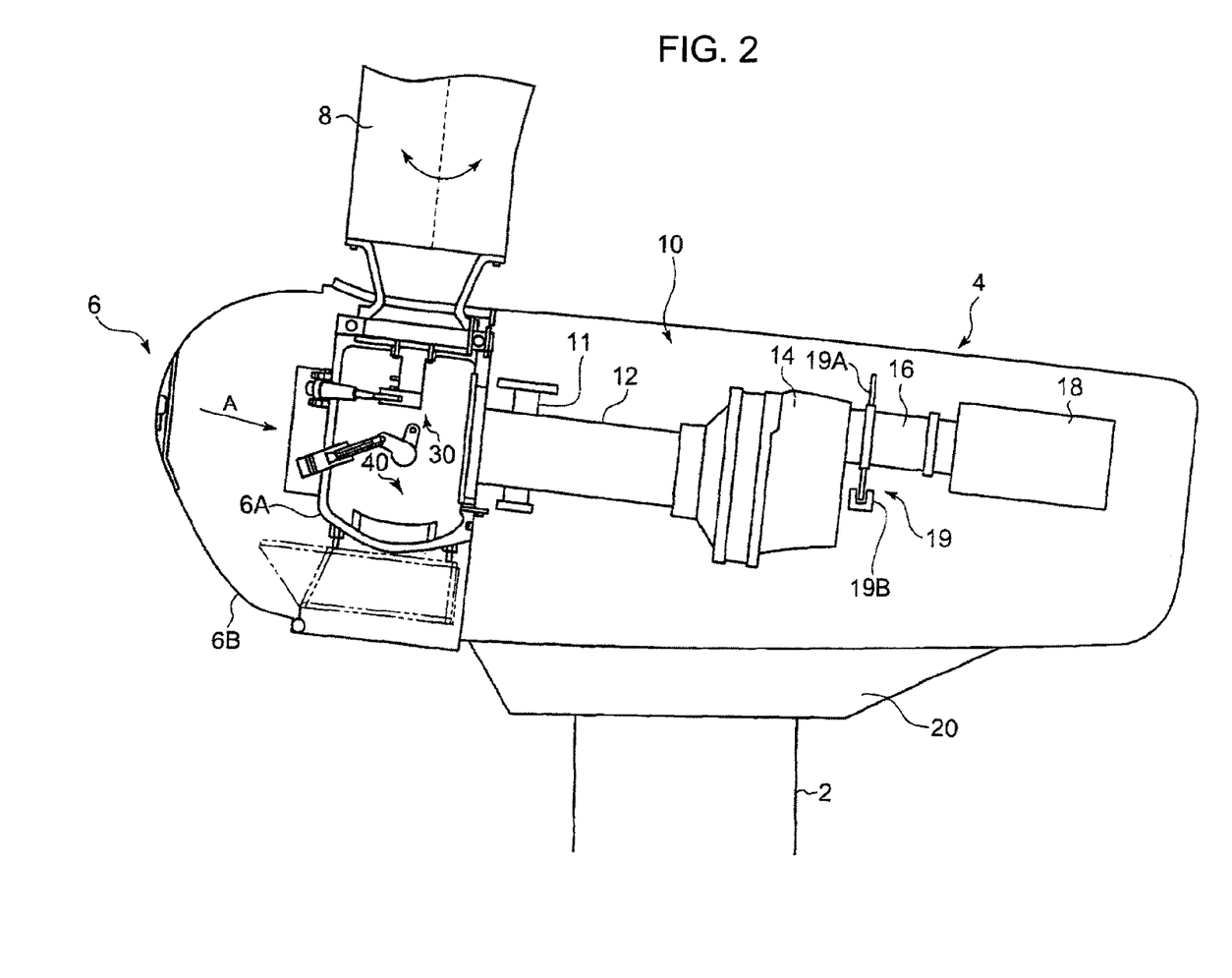
FIG. 2 A side view showing a drive-train and a generator inside a nacelle.

FIG. 2 shows a detailed view of the rotation shaft 10 and the generator 18 inside the nacelle 4. In this example, the rotation shaft 10 includes a main shaft 12 that is connected to a rotor hub 6A of the rotor head 6, a gearbox 14 connected to the main shaft 12 and a coupling 16 that couples the gear box 14 to the generator 18. In the wind turbine generator 1, when the blades 8 receive the wind, the main shaft 12 rotates with the rotor hub 6A and the rotation of the main shaft is sped up by the gearbox 14, and then inputted to the generator 18 via the coupling 16.

In this example, as a part of the coupling 16, a parking brake 19 comprising a brake disk 19A and brake pads 19B. The parking brake 19 is structured such that the brake pads 19B are pressed against the brake disk 19A at front and back surfaces of the brake disk 19A so as to hold the brake disk between the brake pads 19B, thereby braking the rotation shaft.

As shown in FIG. 1 and FIG. 2, the rotor head 6 is fixed to the nacelle 4 rotatably around a near horizontal axis thereof and includes the rotor hub 6A to which the blades 8 are fixed and a head capsule 6B which covers the rotor hub 6A.

Figure 3:
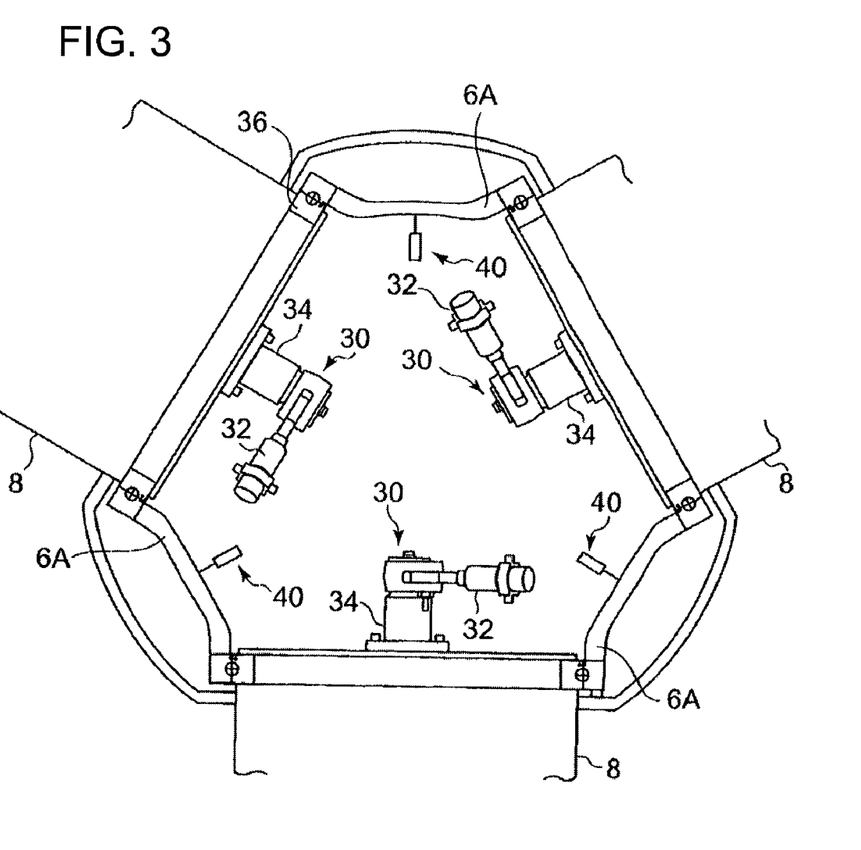
FIG. 3 A sectional view of an inner structure of a rotor head taken by arrow A of FIG. 2.

FIG. 3 is a sectional view of an inner structure of the rotor hub 6A taken by arrow A of FIG. 2. As shown in the figure, the rotor hub 6A comprises a pitch control unit 30 which adjusts the pitch angle of the blades 8 by rotating the blades around the axis along the longitudinal direction thereof (i.e. rotating in the direction indicated with an arrow in FIG. 2).

The pitch control unit 30 mainly includes a cylinder 32 and a shaft 34 being connected to the blade 8. The blade 8 is rotatably supported by bearings 36 in a pitch direction. Therefore, when the shaft 34 is rotated by the cylinder 32 of the pitch control unit 30, the blade 8 rotates in the pitch direction with the shaft 34.

In this manner, the devices such as the pitch control unit 30 are accommodated in the rotor hub 6A. Thus, if there is a foreign object inside the rotor hub 6A, the foreign object moves inside the rotor hub 6A during the normal operation of the wind turbine generator 1, thereby causing damage to the devices inside the rotor hub 6A.

In view of the problem, the present embodiment proposes to provide a foreign object detection sensor 40 (hereinafter referred as FO detection sensor) for detecting the presence of a foreign object inside the rotor hub 6A as illustrated in FIG. 2 and FIG. 3. The FO detection sensor 40 may be chosen from a variety of sensors as long as it can output the presence of the foreign object inside the rotor hub 6A as a change of a physical quantity. The physical quantity herein means a physical quantity that reflects the influence caused when the foreign object makes contact with the FO detection sensor 40.

Figure 4:
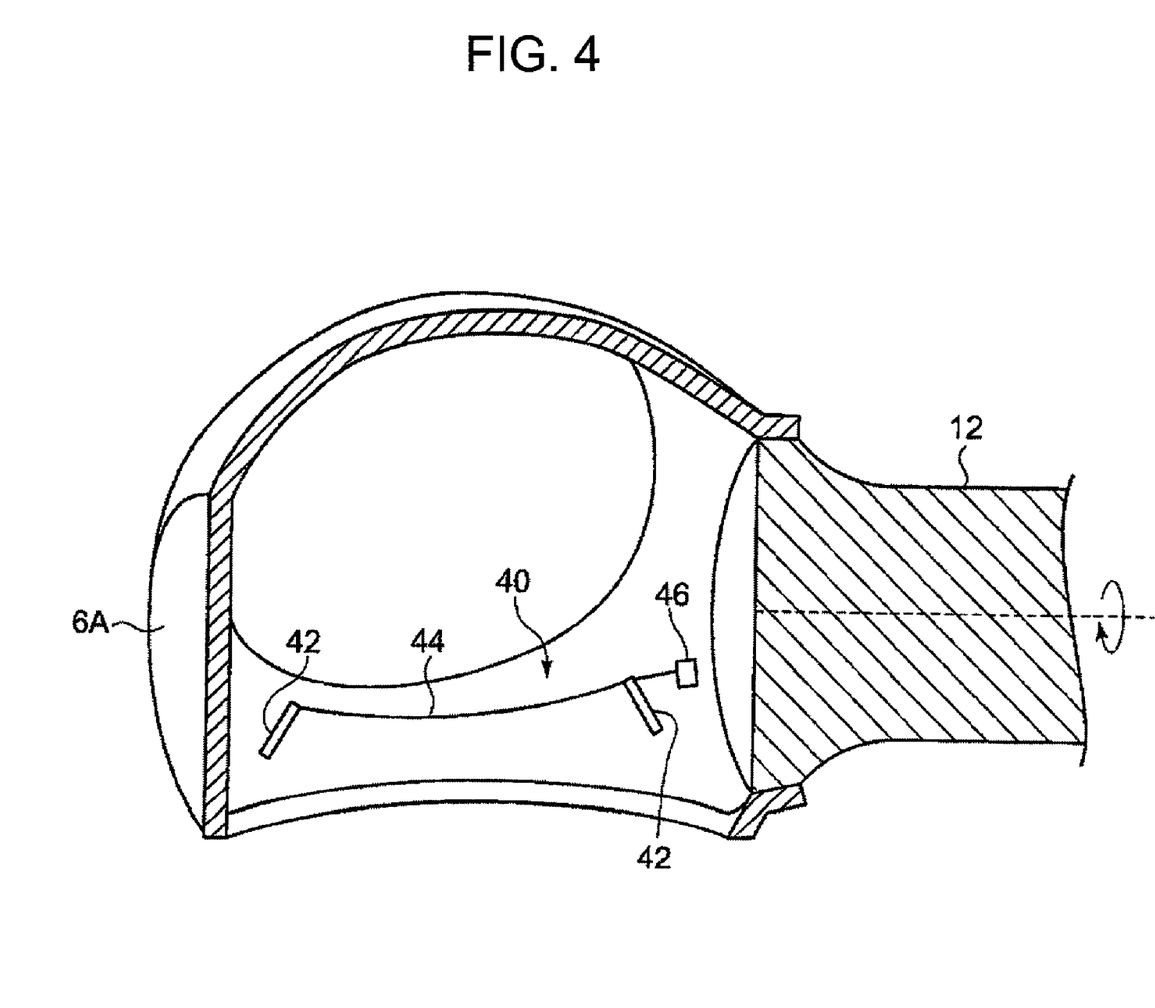
FIG. 4 A configuration example of a foreign object detection sensor.

FIG. 4 is a configuration example of the FO detection sensor 40. FIG. 5 is a diagrammatic view of detecting foreign objects by the FO detection sensor 40. In the rotor hub 6A of FIG. 4, the blades 8, the bearings 36, and the pitch control unit 30 are removed for the sake of simplicity and the rotor hub 6A is illustrated as a sectional view.

The FO detection sensor 40, for example as shown in FIG. 4, may be constructed with a contact part 44 which is fixed to an inner wall of the rotor hub 6A via supporting columns 42 and a limit switch 46 which is connected to the contact part 44.

The contact part 44 of FIG. 4 is a rope-like member which is stretched between the pair of supporting columns 42, and arranged in the location where the foreign object is likely to pass when the rotor hub 6A rotates. When the rotor hub 6A rotates with the main shaft 12, the foreign object inside the rotor hub 6A moves or falls along the inner wall of the rotor hub 6A. Therefore, the contact part 44 is preferably arranged extending in the axial direction of the main shaft along the inner wall of the rotor hub 6A with a predetermined height (e.g. 1 cm to 20 cm) away from the inner wall. With this, the probability that the foreign object makes contact with the contact part 44 increases significantly, and the presence of the foreign object in the rotor hub 6A can be detected at an early stage.

The limit switch 46 is turned on and off by transmitting the movement of an operating member to a built-in micro switch by a link or a lever mechanism. The operating member of the limit switch 46 is connected to the contact part 44 and moves in accordance with the change in shape of the contact part 44.

Figures 5A, 5B:
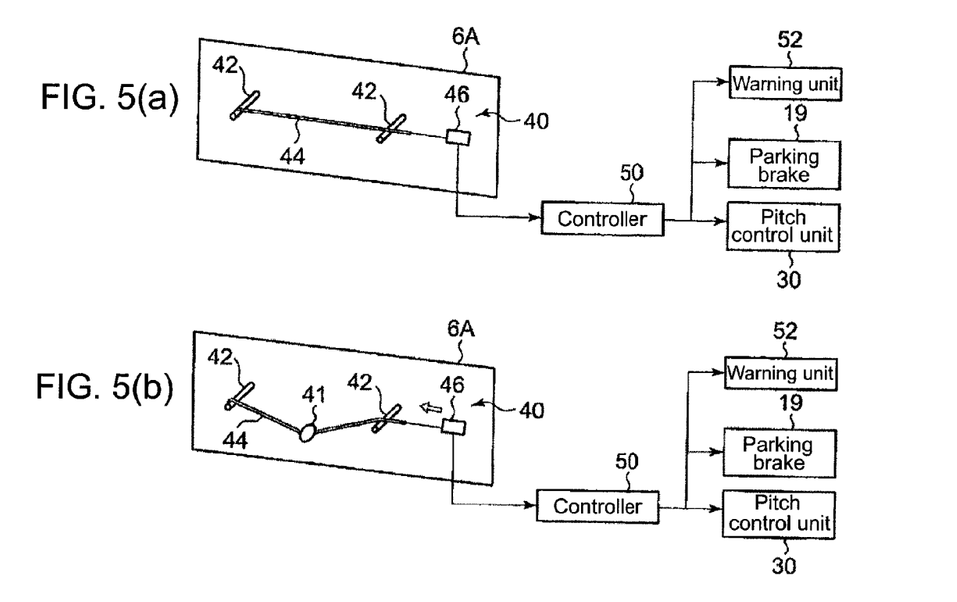
FIG. 5 A diagrammatic view of detecting foreign objects by the foreign object detection sensor shown in FIG. 4.

With the FO detection sensor 40 with the above structure, as shown in FIG. 5(*a*) and FIG. 5(*b*), when the foreign object 41 touches the contact part 44, the shape of the contact part 44 changes and the operating member of the limit switch 46 moves in the direction indicated with an arrow and then ON/OFF state of the limit switch 46 is switched. With the limit switch 46, the foreign object inside the rotor hub 6A is detected.

Further, the limit switch 46 is connected to a controller 50, and in response to the ON/OFF state of the limit switch 46, a warning unit 52, the parking brake 19 and the pitch control unit 30 are controlled by the controller 50.

Specifically, when the presence of the foreign object 41 inside the rotor hub 6A is detected by the limit switch 46, under the control of the controller unit 50, the warning unit 52 sets off the warning about the presence of the foreign object 41 and the parking brake 19 and the pitch control unit 30 stop the rotation of the rotating shaft of the wind turbine generator 1. The stopping of the rotation of the rotating shaft may be performed, for example, in the following order: switching the operation of the blades 8 into a feathering mode by the pitch control unit 30; suppressing or stopping the rotation of the rotating shaft; and keeping the rotating shaft immovable by the parking brake 19.

Meanwhile, the warning unit 52 is not limited to the above structure as long as being capable of announcing the presence of the foreign object. For instance, the warning unit may be a speaker giving a sound warning or a warning lamp arranged in a control panel in the nacelle 4 or the tower 2.

FIG. 4 and FIG. 5 illustrate an example in which the contact part 44 of the FO detection sensor 40 is a rope-like member stretched between the pair of columns 42. However, the structure or shape of the contact part is not limited to this as long as the shape thereof changes when the foreign object touches the contact part. For example, the contact part can be a net-like member.

Figure 6:
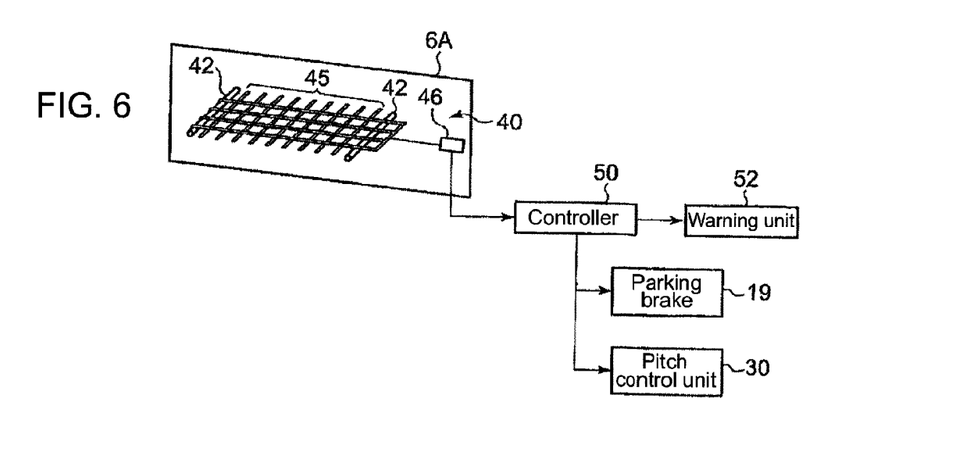
FIG. 6 A diagrammatic view of detecting foreign objects when a different contact part is used for the foreign objects detection sensor.

FIG. 6 illustrates an example structure of the contact part being formed of the net-like member. As shown in FIG. 6, a contact part 45 is formed as the net-like member supported by the support columns 42 so as to be set up from the inner wall of the rotor hub 6A. The contact part 45 has a two-dimensional structure and thus the probability that the foreign object makes contact with the contact part 45 is higher than the case with the contact part 44 having one-dimensional structure shown in FIG. 4 and FIG. 5. That is, the precision of detecting the foreign object can be efficiently improved by using the contact member 45 formed of the net-like member. Furthermore, with the contact member 45 formed of the net-like member, the foreign object is received (entangled) in the contact part 45 and prevented from moving farther, thereby preventing a further damage to the inner structure of the rotor hub 6A.

In the example illustrated in FIG. 4 and FIG. 5, the FO detection sensor 40 includes the contact part 44 and the limit switch 46. However, instead of the limit switch 46, a sensor member for detecting the change of shape of the contact part 44 by an arbitrary method when the foreign object 41 makes contact with the contact part 44, can be used. For instance, instead of the limit switch 46, the presence of the foreign object can be detected by a displacement sensor for detecting the displacement of the contact part 44 when the foreign object 41 touches the contact part 44, a strain sensor for measuring a change of strain of the contact part 44 when the foreign object 41 touches the contact part 44, or an image sensor such as a CCD sensor and CMOS sensor which take an image of the contact part 44 changing the shape thereof when the foreign object 41 touches the contact part 44.

Moreover, besides the embodiment of using a sensor such as the FO detection sensor 40 for detecting the change of shape of the contact part 44 when the foreign object 41 touches the contact part 44, the foreign object 41 moving inside the rotor hub 6A may be directly detected by a sensor. For example, the FO detection sensor 40 may comprise a light irradiating part for irradiating light and a light receiving part for receiving the light from the light irradiating part and the presence of the foreign object 41 is detected by determining whether or not the light irradiated from the irradiating part is received by the receiving part without being obstructed. Or the presence of the foreign object 41 may be detected by the FO detection sensor 40 having an image sensor taking an image of inside the rotor hub 6A in which the images taken by the image sensor are analyzed so as to determine the presence of the foreign object 41 inside the rotor hub 6A. In this case, the area to which the light is irradiated by the light irradiating part or of which the images are taken by the image sensor preferably includes the area which extends along the inner wall surface of the rotor hub 6A in the axial direction of the main shaft 12 with a predetermined space (e.g. 1 cm to 20 cm off) from the inner wall.

Figure 7:
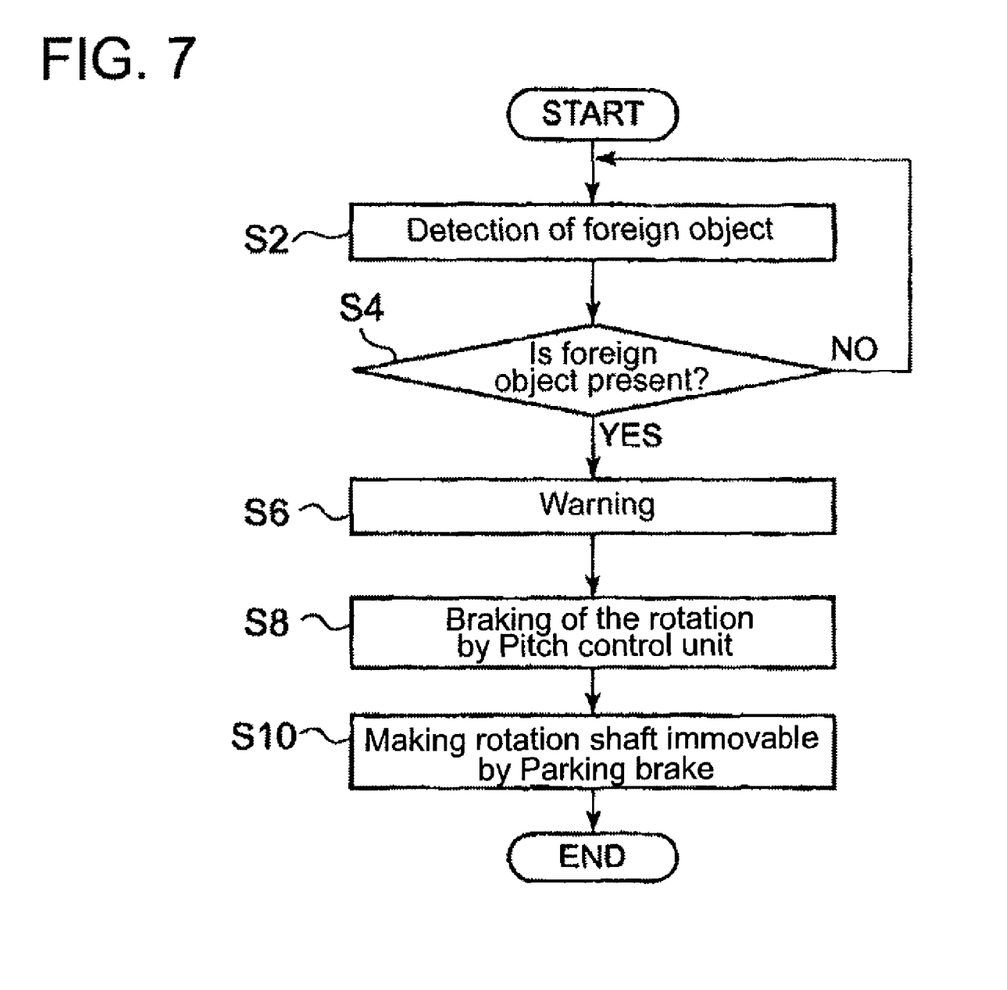
FIG. 7 A flow chart of an operation of the wind turbine generator.

Next, the operation of the wind turbine generator described above is explained. FIG. 7 is a flow chart of an operation of the wind turbine generator 1. The operation described below is preferably performed by actuating each member of the wind turbine generator under the control of the controller 50, such as the FO detection sensor 40, the parking brake 19, the pitch control unit 30 and the warning unit 52, but may be performed by manually inputting instructions in whole or in part to each member of the wind turbine generator without using the controller 50.

First, in a step S2, the presence of the foreign object inside the rotor hub 6A is detected by the FO detection sensor 40. Specifically, in the case of the foreign object being present in the rotor hub 6A, the tension generated when the foreign object comes in contact with the contact part 44 of the FO detection sensor 40, causes the operating member of the limit switch 46 to be pulled to the contact part 44 side, thereby changing the ON/OFF state of the limit switch 46. Thus, by determining whether or not the ON/OFF state of the limit switch 46 is changed, the presence of the foreign object in the rotor hub 6A is detected. Then, the detection result is sent to the controller 50 being connected to the limit switch 46.

In a step S4, the controller 50 determines whether or not the foreign object is present in the rotor hub 6A based on the detection result from the limit switch 46.

When the controller 50 determines that there is a foreign object inside the rotor hub 6A (YES in the step S4), the process advances to a step S6 to give such warning that there is a foreign object by the warning unit 52 under the control of the controller 50.

The process further advances to a step S8 in which under the control of the controller 50, the pitch control unit 30 adjusts the pitch of the blades 8 and switches the operation of the blades 8 into the feathering mode so as to stop the rotation of the rotating shaft of the wind turbine generator 1.

After the rotation of the rotating shaft of the wind turbine generator 1 is slowed down or stopped, in a step S10, under the control of the controller 50, the parking brake keeps the rotating shaft immovable. Specifically, the parking brake 19 makes the rotating shaft (coupling 16) immovable by pressing the brake pads 19B against the brake disk 19A at front and back surfaces of the brake disk 19A so as to hold the brake disk between the brake pads 19B.

Meanwhile, when it is determined that there is no foreign object inside the rotor hub 6A in the step S4, the process returns to the step S2 so as to perform the detection of the foreign object again by the FO detection sensor 40.

As explained above, in the present embodiment, the wind turbine generator 1 comprises the blades 8, the rotor hub 6A to which the blades 8 are fixed, the rotating shaft such as the main shaft 12 and the coupling 16 being connected to the rotor hub 6A and rotating with the rotor hub 6A, the FO detection sensor 40 arranged inside the rotor hub 6A for detecting a foreign object inside the rotor hub 6A, the brake device such as the pitch control unit 30 and the parking brake 19 for stopping the rotation of the rotating shaft, and the controller 50 for controlling the brake device to stop the rotation of the rotating shaft when the FO detection sensor 40 detects the foreign object.

The wind turbine generator 1 comprises the FO detection sensor 40 for detecting a foreign object inside the rotor hub 6A, and the controller 50 controlling the brake device to stop the rotation of the rotating shaft when the FO detection sensor 40 detects the foreign object and as a result, the damage inside the rotor hub 6A caused by the foreign object can be prevented.

While the present invention has been described with reference to exemplary embodiments, it is to be understood that the invention is not limited to the disclosed exemplary embodiments and that modifications and variations are possible within the scope of the appended claims.

For example, the sensor of the above embodiment for detecting the foreign object inside the rotor hub 6A is the FO detection sensor 40 including the contact part 44 and the limit switch 46 and constructed mainly such that the presence of the foreign object is detected by the deformation of the contact part 44 when the foreign object touches the contact part 44. However, the FO sensor may be constructed as explained below.

Figure 8A:
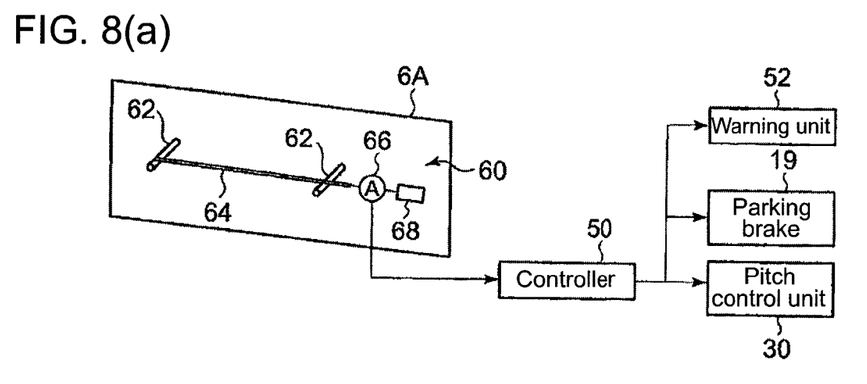
FIG. 8 A diagrammatic view of another foreign object detection sensor as an example.

FIG. 8 is a diagrammatic view of another FO detection sensor. As shown in FIG. 8 (a), another FO detection sensor 60 may comprises a contact part 64 formed of a conductive wire which gets disconnected when the foreign object makes contact with the contact part 64, and a detector 66 for detecting the conduction state of the contact part 64. In other words, the FO detection sensor 60 is unique in that the foreign object is detected when the contact part 64 (conductive wire) gets disconnected.

As shown in FIG. 8 (a), the contact part 64 is a rope-like member stretched between the pair of support columns 62 and formed of a conductive material such as copper and aluminum. The contact part 64 is arranged in the location where the foreign object is likely to pass when the rotor hub 6A rotates. Therefore, the contact part is preferably arranged to extend in an axial direction of the main shaft 12 along the inner wall of the rotor hub 6A. With this, the probability that the foreign object makes contact with the contact part 64 increases significantly, and the presence of the foreign object in the rotor hub 6A can be detected at an early stage. Moreover, the contact part 64 illustrated in FIG. 8 (a) is a rope-like member stretched between the pair of columns 62 but can be in a variety of shape including a net-like member as long as electrical property thereof changes by the interference of the foreign object.

The detector 66 is not limited to the above construction as long as it can detect the conduction state of the contact part 64 (i.e. capable of detecting the disconnection of the contact part 64). For instance, an ammeter can be used to measure the current being passed to the contact part 64. In this case, the detector 66 is arranged in the location between the contact part 64 and an electric current source 68 for supplying current to the contact part 64.

Figure 8B:
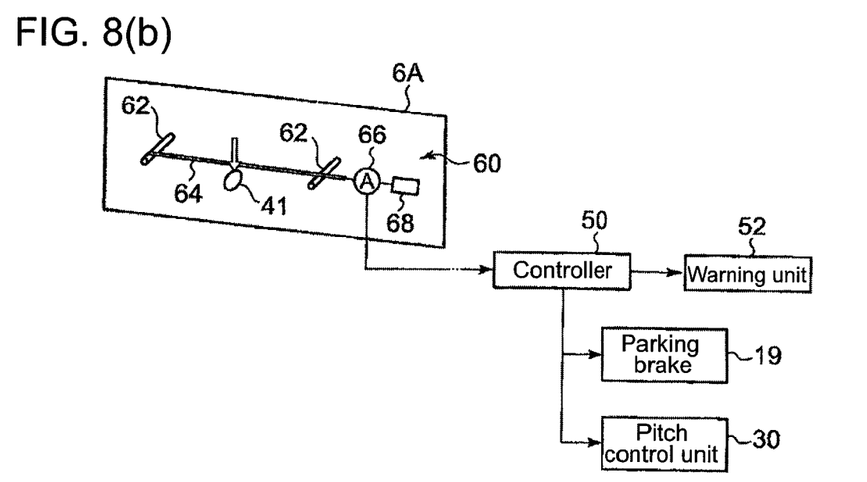

As illustrated in FIG. 8 (b), when the foreign object 41 makes contact with the contact part 64, the contact part 64 is disconnected and the current flowing through the detector 66 becomes zero. The detector 66 detect that there is no current as the contact part 64 gets disconnected and transmits such electric signal to the controller 50. The controller 50 determines the presence of the foreign object in the rotor hub 6A based on the electric signal from the detector 66. When the controller 50 determines that the foreign object is present in the rotor hub 6A, under the control of the controller 50, the warming of the foreign object being present in the rotor hub 6A is set off and the rotation of the rotating shaft of the wind turbine generator 1 is stopped by the parking brake 19 and the pitch control unit 30.

The invention claimed is:

1. A wind turbine generator comprising:
   blades;
   a rotor hub to which the blades are fixed;
   a rotating shaft which is connected to the rotor hub and rotates with the rotor hub;
   a sensor which is arranged inside the rotor hub and detects a foreign object inside the rotor hub;
   a brake device which stops rotation of the rotating shaft; and
   a controller which controls the brake device to stop the rotation of the rotating shaft when the sensor detects the foreign object;
   wherein the sensor comprises:
   a contact part which is fixed to an inner wall of the rotor hub so as to be in contact with the foreign object; and
   a limit switch which is connected to the contact part and is turned on or off by tension being generated when the contact part comes in contact with the foreign object.

2. The wind turbine generator according to claim 1, wherein the contact part is arranged to extend in an axial direction of the rotating shaft along the inner wall of the rotor hub.

3. A wind turbine generator comprising:
   blades;
   a rotor hub to which the blades are fixed;
   a rotating shaft which is connected to the rotor hub and rotates with the rotor hub;
   a sensor which is arranged inside the rotor hub and detects a foreign object inside the rotor hub;
   a brake device which stops rotation of the rotating shaft; and a controller which controls the brake device to stop the rotation of the rotating shaft when the sensor detects the foreign object;
wherein the sensor comprises:
a contact part which is formed of a conductive wire fixed to an inner wall of the rotor hub so as to be in contact with the foreign object; and
a detector which detects conduction state of the contact part.

4. The wind turbine generator according to claim 3, wherein the contact part is arranged to extend in an axial direction of the rotating shaft along the inner wall of the rotor hub.

5. An operating method of a wind turbine generator including blades, a rotor hub to which the blades are fixed, a rotating shaft which is connected to the rotor hub and rotates with the rotor hub, a sensor which is arranged in the rotor hub and detects a foreign object inside the rotor hub, and a brake device which stops rotation of the rotating shaft, the operating method comprising the steps of:
detecting the foreign object in the rotor hub by the sensor; and
when the foreign object is detected by the sensor, stopping rotation of the rotating shaft by the brake device;
wherein the sensor comprises:
a contact part which is fixed to an inner wall of the rotor hub so as to be in contact with the foreign object; and
a limit switch which is connected to the contact part and is turned on or off by tension being generated when the contact part comes in contact with the foreign object.

* * * * *